United States Patent [19]

van der Lely

[11] 4,141,508
[45] Feb. 27, 1979

[54] SPREADER

[75] Inventor: Ary van der Lely, Maasland, Netherlands

[73] Assignee: C. van der Lely N.V., Maasland, Netherlands

[21] Appl. No.: 759,671

[22] Filed: Jan. 17, 1977

[30] Foreign Application Priority Data

Jan. 16, 1976 [NL] Netherlands .......................... 7600408

[51] Int. Cl.² .............................................. A01C 3/06
[52] U.S. Cl. ..................................... 239/664; 239/673;
239/676; 222/267; 222/486
[58] Field of Search ............... 222/267, 310, 545, 486,
222/559; 239/664, 665, 672, 673, 674, 676;
198/566

[56] References Cited

U.S. PATENT DOCUMENTS

| 42,871 | 5/1864 | Penn | 222/310 X |
|---|---|---|---|
| 241,924 | 5/1881 | Buswell | 222/310 X |
| 373,870 | 11/1887 | Whitman et al. | 222/486 X |
| 2,863,669 | 12/1958 | Allersma | 239/664 |
| 3,017,189 | 1/1962 | Belt | 239/676 X |

Primary Examiner—John J. Love
Attorney, Agent, or Firm—Mason, Mason and Albright

[57] ABSTRACT

A spreader for granular or powdery material such as fertilizer having three conveyors extending transversally from each side of a hopper for the material, the hopper having two funnels and two discharge ports, one for each funnel, each discharge port being disposed above the inboard ends of a corresponding group of conveyors with each conveyor in each group having different lengths and terminating outboard in a rotary disc spreading member, such spreading members being spaced apart about 2 meters in the two groups of conveyors which are aligned. The conveyors each comprise an endless belt which, through further belts, rotate the spreader members about vertical axes. Disposed between each spreader and the end of the corresponding conveyor is a guide hood which guides the flow of material to the rotary disc behind its flat ejector blades which are biased 60° from a radial line intercepting the inward edge of the blade, so that at design speed the material is ejected through an arc of about 180°. A dosing aperture for each conveyor is defined by a sliding plate under each discharge port, the apertures being generally triangular and movable as a group in the same direction under both discharge ports to meter equal amounts of material onto each conveyor. A closing plate for each sliding plate has three stepped edges whereby the apertures are closed separately and successively commencing with the aperture for the longest conveyor and concluding with the aperture for the shortest conveyor.

27 Claims, 10 Drawing Figures

SPREADER

SUMMARY OF THE INVENTION

This invention relates to a spreader for spreading granular or powdery material or both.

According to a first aspect of the present invention there is provided a spreader comprising a frame, a hopper and a conveyor extending away from the hopper which, in the region of the conveyor adjacent the hopper, is disposed to receive material from a delivery portion of the hopper which portion has a delivery port and is provided with a dosing member having a dosing aperture and a closing plate by means of which the flow of material through the delivery port and the dosing aperture can be wholly or partly cut off at will.

Using a spreader in accordance with the present invention, the adjustment of the delivery of material can be controlled so that the spreader can operate more effectively, to distribute the material at a desired rate.

In an advantageous embodiment of the spreader in accordance with the present invention, two or more dosing apertures are provided in the dosing member and the closing plate has two or more portions by means of which at will one or more of the dosing apertures can be completely closed.

According to a second aspect of the present invention there is provided a spreader comprising a frame, a hopper and a conveyor extending away from the hopper which, in the region of the conveyor adjacent the hopper, is disposed to receive material from a delivery portion of the hopper, the hopper comprising two mutually spaced delivery portions each provided with a dosing member having a dosing aperture, the dosing members being coupled with one another so that they are movable simultaneously and in the same direction with respect to the hopper. The delivery of material through the delivery ports can be thus simultaneously adjusted, which may be conducive to the distribution of the material. An advantageous embodiment is obtained when the dosing members each have a dosing slide arranged on the bottom side of the hopper and the dosing slides are coupled with one another by a coupling member connected with an adjusting arm. Preferably, a closing plate is arranged beneath each of the slides, the closing plates being displaceable in the frame independently of one another.

According to a third aspect of the present invention there is provided a spreader comprising a frame, a hopper, and a conveyor extending away from the hopper which being, in the region of the conveyor adjacent the hopper, disposed to receive material from a delivery portion of the hopper, there being provided, near the end of the conveyor remote from the hopper, a spreading member mounted for rotation about an upwardly extending axis, a guide hood being arranged between the conveyor and the spreading member, the guide hood having a first rectilinear portion extending away from a location above the end of the conveyor and a second rectilinear portion which extends towards the spreading member and which is connected to the first rectilinear portion by a curved portion. Thus material can be effectively guided from the conveyor towards the spreading member so that the material can be distributed evenly by the spreading member. An advantageous embodiment is obtained when the guide hood, at its lower end, joins at least part of a conical surface extending to near a disc of the spreading member formed by a rotatable ejecting member. In this way an advantageous flow of material to the ejecting member can be obtained, which has an advantageous effect on the uniform distribution of the material.

For a better understanding of the invention and to show how the same may be carried into effect, reference will now be made by way of example to the accompanying drawings, in which:

DESCRIPTION OF THE PREFERRED EMBODIMENT

The spreader shown in the Figures comprises a frame 1 provided with a hopper 2. The hopper 2 has two delivery funnels 3 and 4 disposed transversely of the intended direction of travel 20 of the spreader at a distance from one another. The spreader comprises conveyors formed by conveyor belts 5, 6 and 7 extending sideways away from the hopper over unequal distances and each having one end located beneath the funnel 3. Conveyors formed by conveyor belts 8, 9 and 10 extend towards the other side of the device over unequal distances transversely of the direction of movement 20. The conveyor belts 8, 9 and 10 have each one end located beneath the funnel 4. Near each end of the conveyor belts 5 to 10 are arranged spreading members 11, 12 and 13 on one side and 13, 14, and 16 on the other. Each of the spreading members is adapted to rotate about a vertically axis and is driven by the respective conveyor belt.

Figure 4:
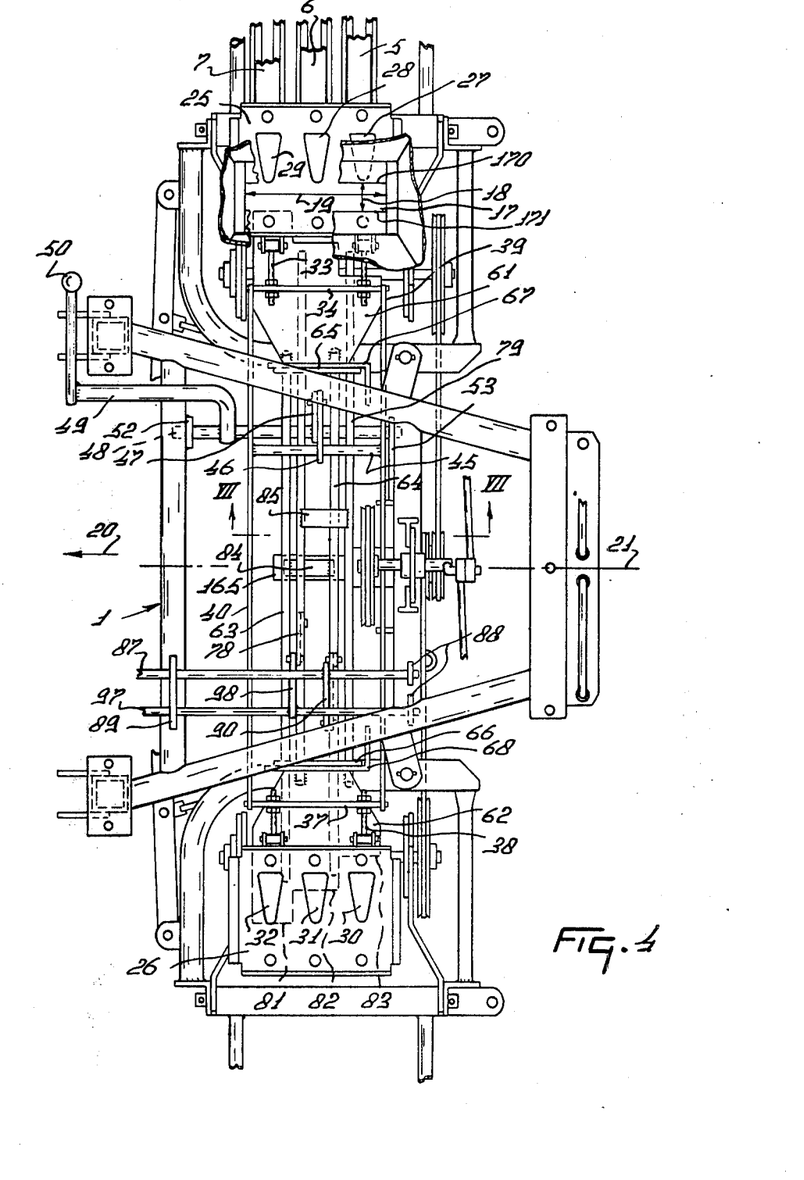
FIG. 4 is a plan view of the part of the spreader shown in FIG. 3 taken on the line IV—IV in FIG. 3.
Figure 5:
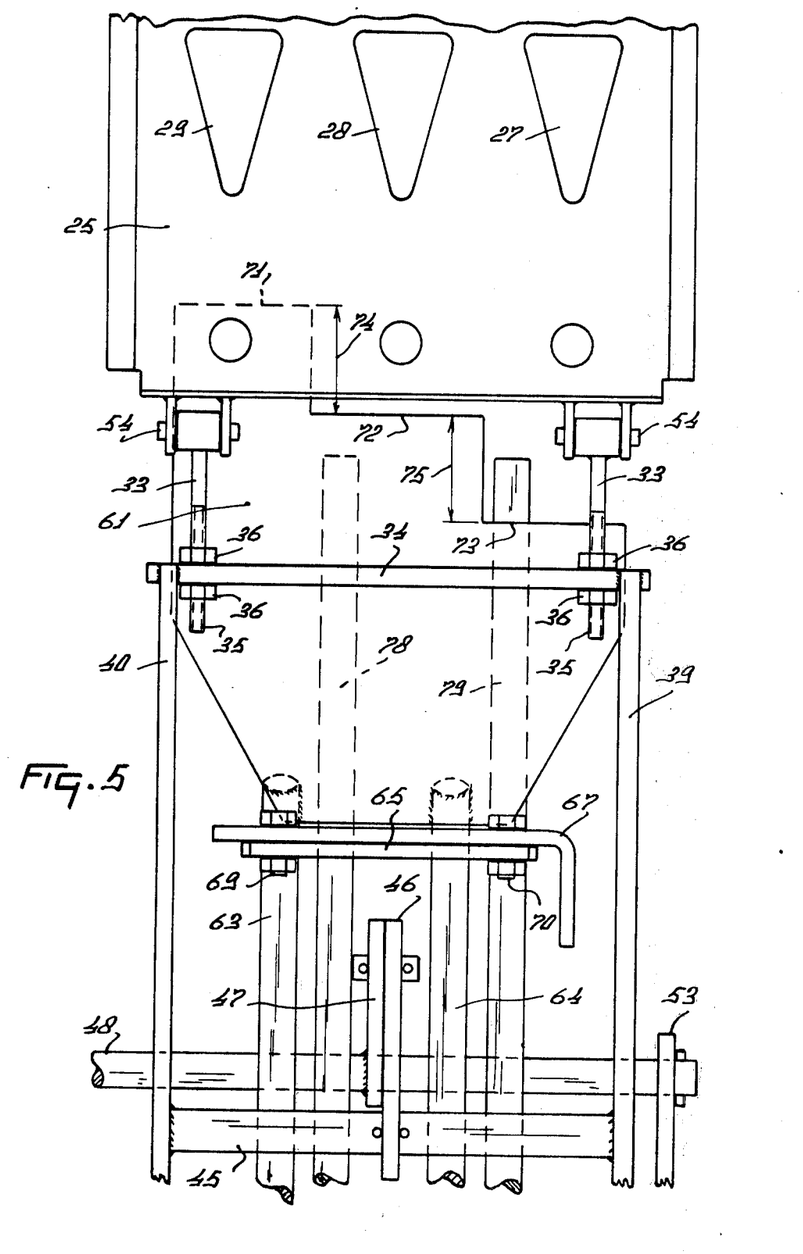
FIG. 5 shows on an enlarged scale part of the spreader shown in FIG. 4.
Figure 6:
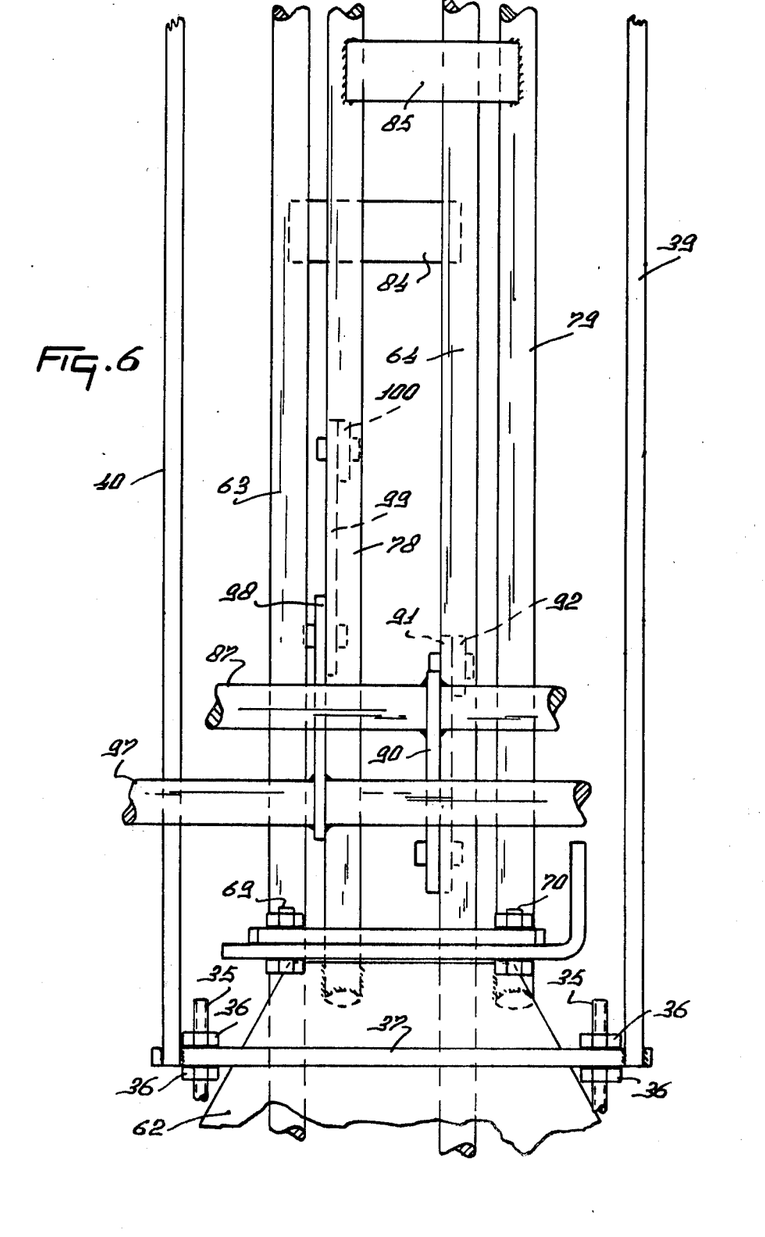
FIG. 6 shows on an enlarged scale a further portion of the part of the spreader shown in FIG. 4.
Figure 7:
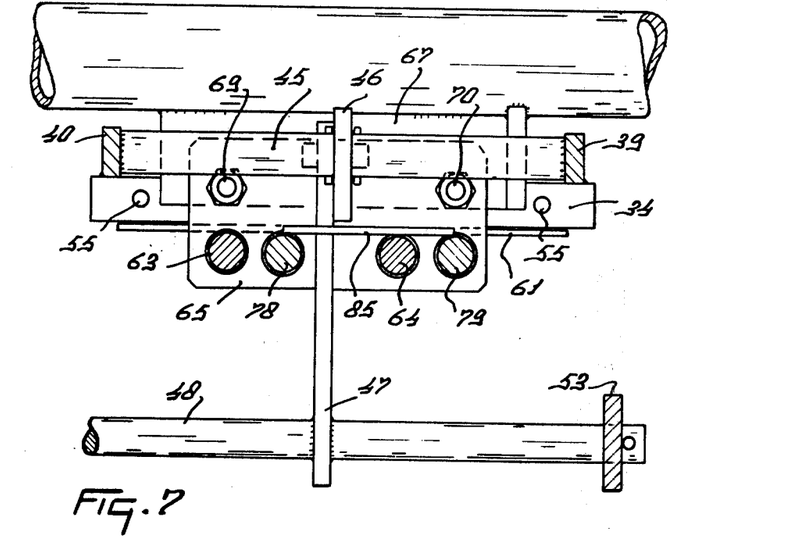
FIG. 7 is a sectional view of a portion of the part of the spreader shown in FIG. 4 taken on the line VII—VII in FIG. 4.

Each of the delivery funnels 3 and 4 has an elongate delivery port, for example the delivery port 17 of the funnel 3 shown in FIG. 4. The elongate delivery ports are located above the inner ends of the conveyor belts arranged beneath the respective funnels 3 and 4. As is shown for the port 17, the delivery ports have a width 18 and a length 19, which is parallel to the direction of movement 20 of the spreader. Beneath the delivery port 17 of the funnel 3 a dosing slide 25 is held in a support 23 on the bottom side of the funnel 3 so as to be movable transversely of the longitudinal axis 21 of the spreader. Beneath the delivery funnel 4 a dosing slide 26 is displaceable transversely of the direction of movement 20 and is held by a support 24 fastened to the bottom side of the funnel 4. The slide 25 has three dosing apertures 27, 28 and 29 generally in the form of isosceles triangles, having bases which are aligned and vertices which are rounded and located on a common line. The slide 26 has three dosing apertures 30, 31 and 32 identical with the apertures 27 to 29. The apertures 30 to 32 in the slide 26 are grouped and orientated in the same direction as the apertures 27 to 29.

Viewed on plan the apertures 27, 28 and 29 are located above the inner ends of the conveyor belts 5 to 7, whereas the apertures 30 to 32 are located above the inner ends of the conveyor belts 8, 9 and 10. Each of the groups of apertures in the respective slides 25 and 26 is arranged in a row extending parallel to the direction of length of the delivery ports, for example, the delivery port 17 of the funnel 3. The slide 25 is provided by means of pivotal shafts 54 with tie rods 33 having each a screwthreaded end for receiving two nuts 36. The screwthreaded ends 35 are each passed through an opening 55 in a strip 34 and are secured to said strip by means of the nuts 36 located one on each side of the strip. The strip 34 constitutes one frame member of a rectangular coupling framework comprising a strip 37 parallel to the strip 34. The strips 34 and 37 constitute the short sides of the coupling framework and are interconnected by strips 39 and 40 forming the long sides of the coupling framework. The slide 26 is provided like the slide 25 with tie rods 38, by which the slide is connected with the strip 37. Between the strips 39 and 40 a supporting rod 45 is arranged, to which an arm 46 is pivoted. The end of the arm 46 remote from the rod 45 is pivotally coupled with an arm 47, which is fastened to a rod 48. The rod 48 is held in supports 52 and 53 of the frame 1 and rigidly secured to a coupling rod 49, which is provided with an adjusing arm 50. The arm 50 is passed through an elongate hole in a strip 51 connected with the frame 1.

Beneath the slide 25 a closing plate is arranged and a closing plate 62 is located beneath the slide 26. The closing plate 61 is rigidly secured to guide rods 63 and 64 displaceably held in supports 65 and 66. The supports 65 and 66 are fastened by means of bolts 69 and 70 to supports 67 and 68 of the frame 1. The closing plate 61 is provided opposite the side where the plate is connected with the rods 63 and 64 with a stepped edge. Thus the plate 61 has stepped portions 71, 72 and 73. The portions 71 to 73 are parallel to one another, the portions 71 and 72 being spaced apart by a distance 74, which is equal to the distance 75 between the portions 72 and 73. The closing plate 62 is connected like the closing plate 61 with guide rods 78 and 79 also held in supporting strips 65 and 66. The closing plate 62 is provided like the closing plate 61 with stepped portions 81, 82 and 83. The rods 63 and 64 are coupled with one another by a coupling plate 84, whereas the rods 78 and 79 are intercoupled by a coupling plate 85. The intercoupled rods 63 and 64 are connected with an adjusting arm 86, having a horizontal portion 87 which is held in supports 88 and 89 provided on the frame. The portion 87 is provided with an arm 90, which is pivoted to an arm 91, which is pivotally coupled with a support 92 fastened to the rod 64. The rods 78 and 79 are coupled with an adjusting arm 96, which has a horizontal portion 97, which is also held in strips 89 and 88. The portion 97 is provided with an arm 98, which is pivoted to an arm 99, which is pivotally arranged in a tag 100 on the rod 78. Each of the adjusting arms 86 and 96 is held in an elongated hole 101 and 102 respectively of a strip 103. Each of the elongated holes 101 and 102 has four notches 104 and 105 respectively, i.e. the number of notches exceeds by one of the number of apertures to be controlled by the respective closing plate.

Figure 8:
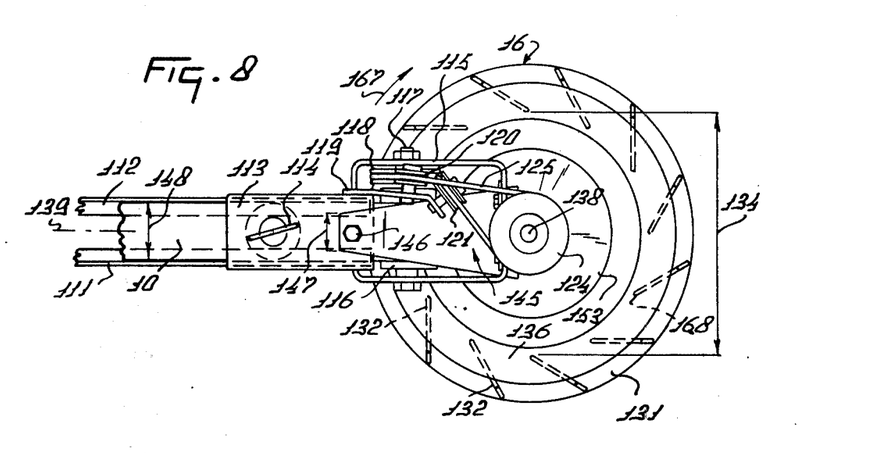
FIG. 8 is a plan view of a rotatable spreading member of the spreader embodying the invention.
Figure 9:
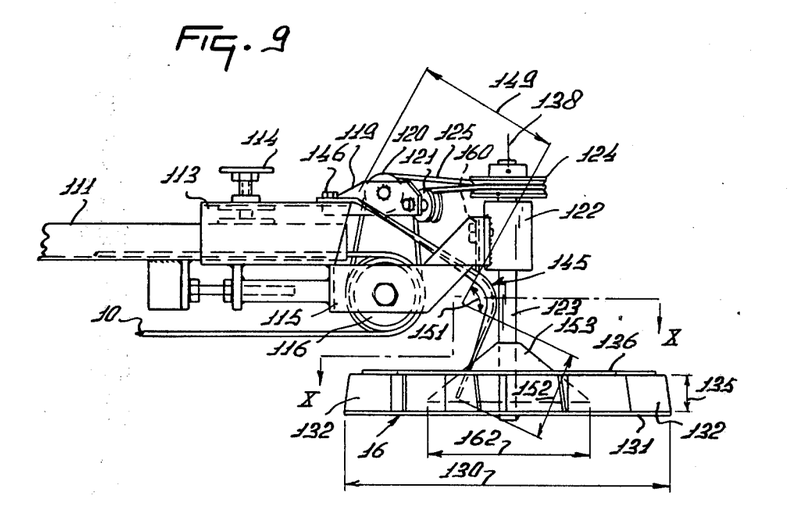
FIG. 9 is a side elevation of the spreading member shown in FIG. 8.

Each of the conveyor belts 5 to 10, as is shown in FIGS. 8 and 9 for the conveyor belt 10, has a support formed by angle-section irons 111 and 112. Each of the spreading members 11 to 16 is connected with the angle-section iron support, as is shown for the spreading member 16 in FIGS. 8 and 9.

Figure 10:
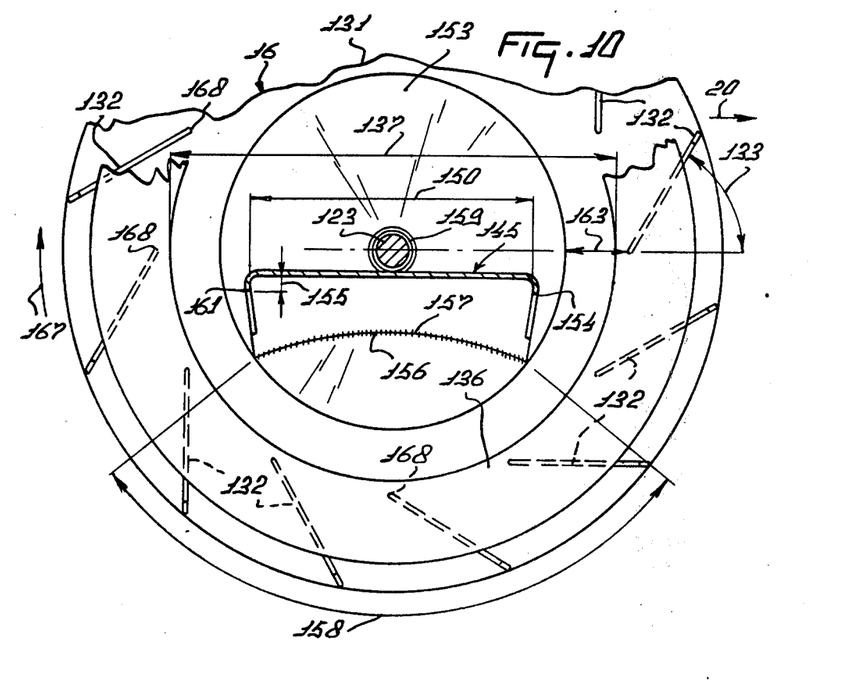
FIG. 10 shows on an enlarged scale a portion of the spreading member taken on the line X—X in FIG. 9.

The constructions of the spreading members are identical and FIGS. 8, 9 and 10 show the same for the spreading member 16. The support formed by the angle-section irons 111 and 112 has fastened to it a carrier member 113, which is clamped to the support by means of a clamping member 114. The carrier member 113 is provided with a bracket or strap 115 holding a roller 116, around which the conveyor belt 10 passes. The roller 116 is rotatable about a shaft 117 fixed in the strap 115. A pulley 118 is rigidly secured to the roller 116. The carrier member 113 comprises a carrier arm 119 provided with two guide rollers 120 and 121. The bracket 115 holds a bearing 122 receiving a shaft 123, to which the spreading member 16 is secured. At the top of the shaft 123 is arranged a pulley 124. Around the pulleys 118 and 124 is passed an endless belt 125, which is guided along the rollers 120 and 121. The spreading member 16 has a diameter 130 of about 290 mms. It comprises a round flat disc 131 provided at its radially outer region with twelve ejecting blades 132. Each blade 132 is at an angle 133 of about 60° to a radial line passing through the radially inner end of the blade. The radially inner ends of the blades 132 are located on a circle having a diameter 134 of about 200 mms. The blades 132 have a height 135 of about 30 mms. A flat ring 136 having an inner diameter 137 slightly smaller then the diameter 134 is mounted on the top edges of the blades 132. The outer diameter of the ring 136 is smaller than the outer diameter 130 of the disc 131. The rotary axis 138 of the spreading member 16 is located in the vertical plane 138 passing through the longitudinal center line of the conveyor belt 10. The carrier member 113 is provided with a guide member 145 in the form of a hood. The guide hood 145 is fastened by means of a bolt 146 to the top side of the carrier member 113. Away from the top side of the carrier member 113, where the hood has a width dimension 147 slightly larger than half the width 148 of the conveyor belt 10, the hood comprises a first portion of length 149 having, viewed from aside, a rectilinear shape (FIG. 9). From the top end where the width is indicated by dimension 147 the hood broadens to a width 150, which measured on the inner side of the guidehood, is about one and a half times the width 148 of the conveyor belt 10. Near the broadest part the guide hood 145 has a curved portion covering an angle 151 of about 90°. After the curved portion the guide hood has a second rectilinear portion of length 152 connected to a conical guide 153. The portion having 152 is at an acute angle of about 65° to the disc 131. This acute angle opens towards the rotary axis 138 of the spreading member 16 (FIG. 9). The conical guide 153 has an angle at its apex of about 100° and is rigidly secured to the hood 145. In the curved portion indicated by angle 151 and over short distances on both sides of said curved portion the guide hood 145 has bent-over rims 161 and 154. These rims 161 and 154 are bent over over only short distances towards the side facing the end of the conveyor belt 10 passing around the roller 116. The curved portion indicated by angle 151 is located approximately at the level of the roller 116, around which the belt 10 passes. The guide hood 145 joins the cone 153 along a curve 156. The topmost part 157 of the curve 156 is located, viewed from a side, above the top side of the spreading member. The ends of the curve 156 are disposed near the lower side of the cone and the angle between the curve 156 and the cone 153 is 110°, said angle being designated 158. The cone 153 has at the center an opening 159 allowing the shaft 153 to pass. Near the top side of the curved portion indicated by angle 151 the guide hood 145 has a carrier arm 160, which is bolted to the bearing 122. The outer diameter 162 of the cone 153 is smaller than the diameter 134 so that a space 163 of about 30 mms is left between the outer periphery of the cone and the radially inner ends of the ejecting blades.

In operation of the spreader, it is coupled with the three-point lift of a tractor, for which purpose the frame is provided with fastening means. Through an auxiliary shaft a driving shaft 165 is coupled with the power take-off shaft of the tractor so that the driving mechanism of the spreader (not shown) for the conveyors can be actuated in operation. During the operation of the spreader the material to be distributed is carried in the hopper 2. From the hopper 2 the material is fed through the delivery ports in the funnel-shaped portions 3 and 4 and the dosing apertures 27 to 32 to the conveyor belts 5 to 10. The quantity of material to be delivered per unit time is regulated by causing the delivery apertures 27 to 32 to co-operate to a greater or lesser extent with the delivery ports such as the port 17. For this purpose the slides 25 and 26 having the delivery apertures 27 to 32 can be shifted and fixed in place by means of the adjusting arm 50. In the position shown in FIG. 4 the apertures 27 to 29 and 30 to 32 are not co-operating with the delivery ports such as the port 17, so that no material can flow from the hopper towards the conveyor belts. Since the slides 25 and 26 are intercoupled via the coupling framework formed by the rods 34, 37, 39 and 40 they are simultaneously displaced in the same direction and to the same extent when the arm 50 is shifted. It will particularly be apparent from FIG. 4 that the delivery apertures 27 to 32 are then orientated in the same manner, the bases of the triangles being parallel to the direction 20 and the vertices of the triangular apertures 27 to 32 being located on the same line transverse of the direction of movement 20. When the slides 25 and 26 are shifted to an extent such that the apertures 27 to 29 arrive beneath the delivery port 17 of the funnel 3 and the apertures 30 to 32 beneath the delivery port of the funnel 4, the material can flow through said apertures towards the conveyor belts 5 to 7 and 8 to 10 respectively. The apertures 27 to 29 and the apertures 30 to 32 are located groupwise in a row, the bases of the triangular dosing apertures of each group being in line with one another. The vertices of the apertures of each group are also located on one line. With respect to the coupling framework formed by the strips 34, 37, 39 and 40 the slides 25 and 26 can be displaced by turning the nuts 36 at the screwthreaded ends of the rods 33 and 38. In this way the apertures 27 to 29 and 30 to 32 in the dosing slides 25 and 26 can be adjusted to the correct place relative to the delivery ports such as the port 17 on the bottom side of the delivery funnels 3 and 4.

The conveyor belts are moved via the driving mechanism (not shown) so that their speed is about 1.25 to 1.50 ms/sec. The material is fed via the conveyor belts towards the respective spreading members 11 to 16. At the ends of the conveyor belts the material is thrown against the guide hoods, such as the guide hood 145 of FIGS. 8 and 9, arranged at the ends of the conveyor belts. Via the relevant guide hood 145 the material is guided towards the portion of the conical surface located beneath the rim 156 and inside the angle 158. From this portion of the conical surface the material is fed to the spreading member, where it arrives at the disc 131. Owing to the space indicated by dimension 163 between the bottom side of the conical surface 158 and the origins of the blades 132 the material will flow uniformly in a satisfactory manner via the disc 131 towards the ejecting blades 132. The material is then guided by the centrifugal force and the blades 132 so that it is spread over a width approximately equal to twice the distance between adjacent spreading members, for example, the distance 166 between the spreading members 15 and 16.

The spreading members, for example, the spreading member 16, are driven via belt 125 from the end roller 116 of the conveyor belt 10. The driving speed is selected so that the spreading member 16 performs about 500 revolutions a minute. The disposition of the blades and the dimensions of the spreading member are selected so that with respect to the direction of movement 20 the material is spread rearwardly through an angle of about 180° about the axis 138 to cover a width approximately equal to twice the distance 166. The center of the spreading angle of about 180° is located in a vertical plane in the direction of movement 20 going through the rotary axis of the spreading member concerned.

Owing to the shape of the guide hood 145 with the adjoining part of the cone 153 the material is fed in even distribution in the angle 158 to the spreading member. Although in this embodiment the cone 153 is a complete cone, it may be sufficient to provide only that part of a cone located within the angle 158 and beneath the curve 156. In the embodiment illustrated, the distance 166 between adjacent spreading members is about 2 meters. The effective working width of the device amounts to about 12 meters. The spreading members 14, 15 and 16 are driven so that, viewed on plan they will rotate in the direction of the arrow 167. With respect to said direction of rotation the radially inner ends 168 of the ejecting blades 132 are orientated to the front. The spreading members 11 to 13 are rotated about their respective axes in the direction of the arrow 169. Viewed on plan, the spreading members 11 to 13 rotate in a sense opposite that of the spreading members 14 to 16. The blades of the spreading members 11 to 13 are arranged so that the radially inner ends are also orientated to the front with respect to the direction of rotation 169, as is shown for the spreading member 16 in FIGS. 8 to 10.

Figure 1:
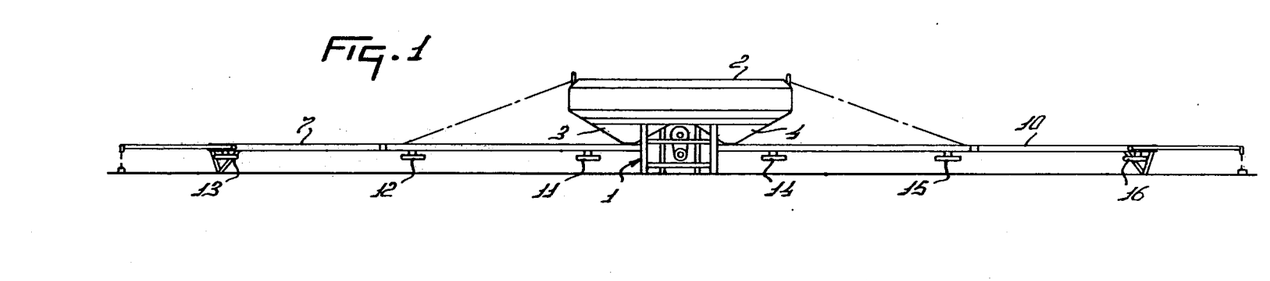
FIG. 1 is a front view of a spreader in accordance with the present invention.
Figure 2:
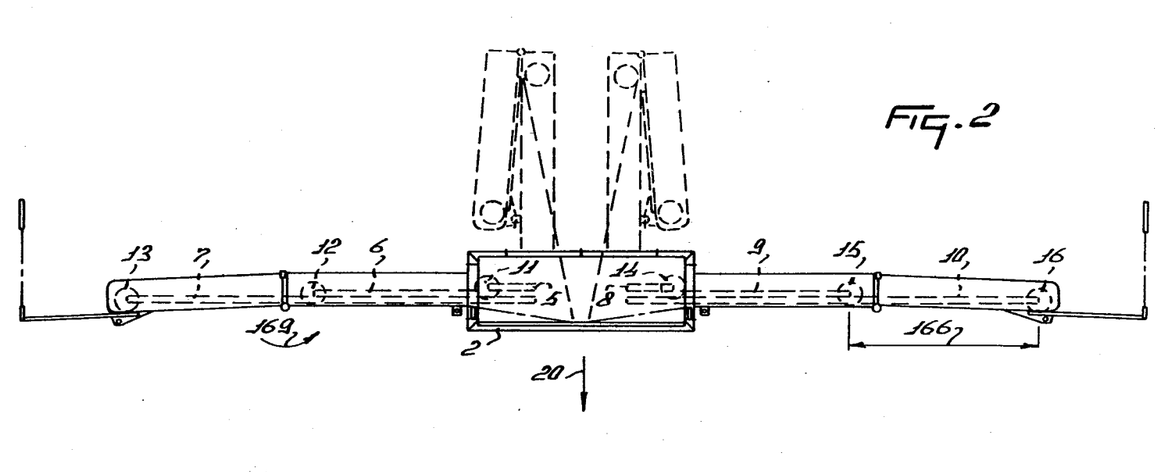
FIG. 2 is a plan view of the spreader shown in FIG. 1.
Figure 3:
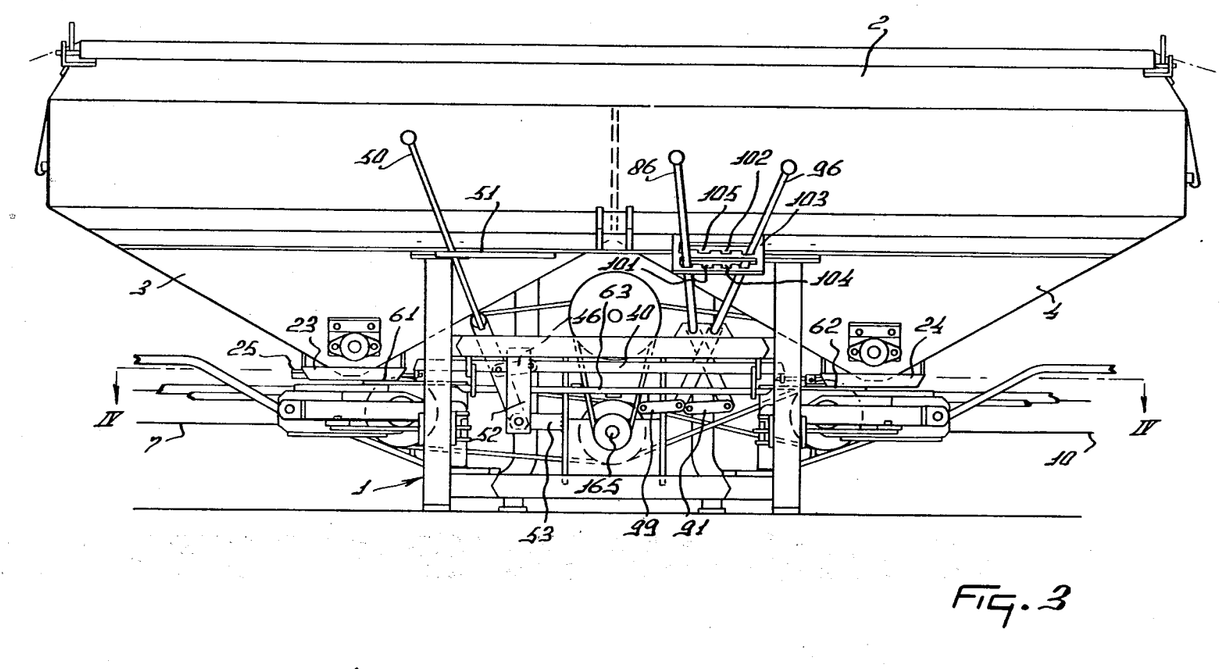
FIG. 3 is an enlarged front view of part of the spreader.

If desired, the supply through the delivery ports 27 to 29 and 30 to 32 towards the respective conveyor belts can be blocked by means of the closing plates 61 and 62. For this purpose the closing plates 61 and 62 can be shifted by means of the adjusting arms 86 and 96 respectively. By moving the closing plate 61 upwardly, as viewed in FIG. 4, over such a distance that, viewed on plan, the edge 71 coincides with the edge 170 of the delivery port 17, the dosing aperture 29 on the bottom side is covered by that portion of the closing plate which is bounded by the edge 71. The edge 72 of the next step of the stepped edge of the plate 61 is then located beneath the edge 171 of the port 17. The distances 74 and 75 are equal to the width 18 of the delivery port. After this shift the arm 86 arrives at a next notch 104, in which it can be retained. The portion of the plate 61 bounded by the edge 71 has a width larger than the dosing aperture 29. Since said portion of the closing plate 61 shuts the aperture 29 and hence also part of the port 17 on the lower side, no material no longer can flow from the hopper through the aperture 29 to the belt 7. Thus the ejecting member 13 will not receive material so that the device distributes the material over a narrower range on the side of the spreading member 13. If the closing plate 61 is moved further up, as viewed in FIG. 4, by displacing the arm 86 to the right, as viewed in FIG. 3, the edge 72 of the closing plate will arrive beneath the edge 170 so that apart from the aperture 29 also the aperture 28 of the dosing slide 25 is covered on the bottom side by the closing plate 61. The belt 6 will thus no longer receive material from the hopper, the supply of material to the spreading member 12 being thus blocked. Since the spreading member 12 no longer receives material from the belt 6, the spreader can spread the material only via the spreading member 11 on the side of the spreading members 12 and 13. On the right-hand side of the spreader, viewed in the direction of movement 20, the material is thus spread only over a distance of about 2 meters. When the closing plate 61 is further shifted upwardly, the edge 73 will arrive, viewed in plan, beneath the edge 170 of the delivery port 17, so that also the aperture 27 of the slide 25 is shut on the bottom side. Then no material is received through port 17 by any of the conveyor belts 5, 6 or 7 located on the right-hand side of the spreader. If the plate 62 is maintained in the position shown in FIG. 4, material can then be fed only to the conveyor belts 8, 9 and 10 and hence to the spreading members 14, 15 and 16. Viewed in the direction of movement 20, the spreader will spread material only on the left-hand side.

In the same manner as described for the closing plate 61 the closing plate 62 can be shifted in place so that at will the apertures 30, 31 and 32 can be successively blocked by the plate 62. The displacement of the plate 62 can be performed by means of the adjusting arm 96, which is then moved to the left (see FIG. 3).

It will be obvious that at will, for example, only the apertures 29 and 32 may be closed by the plates 61 and 62. Then the spreader will spread the material on either side over the same ranges. The working width is then narrower, since the spreading members 13 and 16 do not receive material and only the spreading members 11, 12, 14 and 15 eject material. In the device described the closing plates 61 and 62 may furthermore be set so that only the spreading members 11 and 14 receive material from the hopper. Independently of the position of the plate 61 the plate 62 may, of course, be adjusted so that none of the spreading members 14, 15 and 16 receives material due to the closure of the apertures 30, 31 and 32. Thus, at will material may be spread either to the right or to the left, viewed in the direction of movement 20 or the overall width of spread of the material may be reduced from the outer side.

Although various features of the spreader which have been described and are illustrated in the drawings, are set forth in the following claims as inventive features, the invention is not necessarily limited to these features and encompasses all other inventive features which have been disclosed, both individually and in combination and equivalents thereof.

Having thus described my invention, what I claim as new and desire to secure by Letters Patent of the United States is:

1. A spreader comprising a frame, a hopper and a plurality of parallel conveyors extending away from said hopper, each said conveyor being, in a region thereof adjacent said hopper, disposed to receive material for spreading from delivery means provided in said hopper, said delivery means comprising a delivery port and being provided with a dosing member, a plurality of dosing apertures and a closing plate included in said dosing member whereby there is at least one corresponding aperture for each said conveyor, said closing plate being movable as a whole relative to said apertures and having separate closing plate portions for each conveyor adapted to close or open said apertures successively one by one by means of which closing plate the flow of said material through said delivery port and said dosing apertures is selectively successively obstructed or provided.

2. A spreader as claimed in claim 1, wherein said dosing member comprises at least three of said dosing apertures and said closing plate comprises at least three corresponding said plate portions by means of which said dosing apertures may be selectively closed.

3. A spreader as claimed in claim 1, wherein said dosing member comprises at least three of said dosing apertures which are arranged in a row, said plate portion comprising stepped edges whereby through displacement of said closing plate relative to said dosing member said dosing apertures may be successively closed.

4. A spreader as claimed in claim 3, wherein said plurality of said conveyors are arranged side by side and a corresponding elongated dosing aperture is provided in said dosing member for each said conveyor, each dosing aperture being adapted and arranged to co-operate with its corresponding said conveyor.

5. A spreader as claimed in claim 4, wherein said conveyors extend laterally of the spreader and said row of dosing apertures extends in a direction which is transverse to the direction of length of the conveyors.

6. A spreader as claimed in claim 5, wherein said conveyors extend perpendicular to the intended direction of travel of the spreader.

7. A spreader as claimed in claim 6, wherein said dosing member comprises a dosing slide, said dosing apertures being included in said dosing slide, said dosing slide being movable in a direction parallel to the direction of length of each said dosing slide.

8. A spreader as claimed in claim 7, wherein said closing plate is movable in a direction parallel to the direction of movement of said dosing slide.

9. A spreader as claimed in claim 8, wherein said stepped edges of said closing plate which successively cover said dosing apertures each extend generally transversely of the direction of displacement of said closing plate.

10. A spreader as claimed in claim 3, wherein said delivery port is elongated, said dosing member being movable in a direction perpendicular to the direction of length of said delivery port.

11. A spreader as claimed in claim 10, wherein said dosing apertures are generally of a triangular configuration, one side of each said aperture being aligned with the corresponding side of the other said apertures, said corresponding sides extending parallel to the longer side of said delivery port.

12. A spreader as claimed in claim 1, wherein said hopper comprises two delivery funnels, each comprising a said delivery means and being provided with a dosing member and a closing plate, said dosing members of said two delivery means being coupled with one another.

13. A spreader comprising a frame, a hopper and plurality of conveyors supported by said frame, each of said conveyors extending away from said hopper and each having a region located adjacent said hopper, means defining a dosing aperture for each said conveyor in said region, each said conveyor operatively associated with said hopper to receive material to be spread from said hopper via said corresponding aperture, a closing plate provided in the spreader to cooperate with said dosing apertures, said closing plate being formed so as to close successively and to open successively in reverse order one after the other said dosing apertures, whereby said plurality of conveyors one after the other are optionally selectively provided with material to be spread or selectively prevented from receiving material from said hopper.

14. A spreader as claimed in claim 13, wherein said hopper is provided with a delivery port cooperating with said dosing apertures, said means defining said dosing apertures comprising a dosing plate located under said delivery port, said dosing plate being displaceable relative to said delivery port so as selectively to obstruct the flow of material from said delivery port through each of said dosing apertures in whole or in part.

15. A spreader comprising a frame, a hopper and a plurality of conveyors extending away from said hopper supported by said frame, said conveyors being arranged side by side and each having a region adjacent said hopper to receive material for spreading from delivery means provided in said hopper, said delivery means comprising at least one delivery port and being provided with a dosing member, a plurality of dosing apertures and at least one closing plate included in said dosing member each of said dosing apertures cooperating with a corresponding conveyor, said closing plate being formed successively to close or successively to open one after the other at least two said dosing apertures through selective displacement of said closing plate as a whole.

16. A spreader comprising a frame, a hopper and at least two conveyors arranged side by side and extending away from said hopper supported by said frame, means defining apertures between said hopper and said conveyors, each of said conveyors having region thereof adjacent said hopper disposed to receive material for spreading from said hopper through a corresponding aperture, said apertures being situated in a row, a closing plate being provided in said spreader, said closing plate located in a cooperative position relative to said apertures, said closing plate being provided with stepped portions formed by a stepped edge of said plate, said stepped portions extending in the direction of said row of apertures, said closing plate being displaceable as a whole relative to said apertures whereby said stepped portions may selectively successively close or successively open said apertures one after the other.

17. A spreader as claimed in claim 16, wherein the longitudinal axis of the spreader and said row of apertures extend in the intended direction of travel of said spreader during operation thereof, said conveyors extending transversely to said longitudinal axis of said spreader.

18. A spreader as claimed in claim 17, wherein a further means defining further apertures is provided, said hopper comprising two delivery funnels, each of which is located in a cooperative position with a corresponding said row of apertures or further apertures and at least two side by side conveyor means, whereby one of said conveyor means cooperating with one of said funnels extend in opposite directions from said hopper relative to the other of said conveyor means co-operating with the other said funnel.

19. A spreader as claimed in claim 18, wherein a further closing plate is provided and said funnels are separated from each other in a direction transverse to said longitudinal axis of said spreader, each of said rows of apertures and further apertures cooperating with a corresponding said closing plate, said closing plates both being displaceable transverse to said longitudinal axis of said spreader.

20. A spreader as claimed in claim 19, wherein each said funnel is provided with a longitudinally elongated delivery port cooperating with a corresponding said row of apertures or further apertures, said apertures and further apertures each being provided in a dosing plate displaceable relative to the corresponding said delivery port to bring said apertures and further apertures in generally a cooperative position therewith, whereby the rate of material which flows through said apertures and further apertures to said corresponding conveyors may be selectively regulated.

21. A spreader comprising: a frame; a hopper and a plurality of side by side generally parallel conveyors supported by said frame; delivery means in said hopper for delivering material to be spread therefrom; means defining apertures adapted to receive said material from said delivery means and distribute said material on two said conveyors, at least one said aperture being provided for each said conveyor; and plate means adapted by movement as a whole relative to said apertures to close or open each said aperture selectively one by one in a predetermined order whereby the delivery of said material to each said conveyor is separately in accordance with said predetermined order provided or prevented by the selected movement of said plate means relative to said apertures.

22. A spreader as claimed in claim 21, wherein said apertures are aligned in a row transverse to the direction of movement of said material by said conveyors, said plate means comprising a plurality of closing portions which, when said apertures are open, are successively at relatively different distances from their respective and corresponding apertures which they are adapted to close.

23. A spreader claimed as in claim 22 wherein, said closing portions are parallel to one another.

24. A spreader as claimed in claim 23, wherein said closing portions are stepped.

25. A spreader as claimed in claim 24, wherein the successive said closing portions are spaced apart by equal distances.

26. A spreader as claimed in claim 21, wherein said aperture defining means is movable relative to said delivery means whereby the rate of delivery through each said aperture may be increased or decreased.

27. A spreader as claimed in claim 26, wherein each said aperture has its longitudinal axis disposed substantially parallel to said conveyors and said delivery means comprises an elongated opening in said hopper having a longitudinal axis disposed substantially perpendicular to said conveyors.

* * * * *